(12) United States Patent
Thompson

(10) Patent No.: US 7,027,431 B1
(45) Date of Patent: *Apr. 11, 2006

(54) WIRELESS DEVICE CONNECTION IN SINGLE MEDIUM WIRING SCHEME FOR MULTIPLE SIGNAL DISTRIBUTION IN BUILDING AND ACCESS PORT THEREFOR

(75) Inventor: William H. Thompson, Pittsford, NY (US)

(73) Assignee: Upstate Systems Tec, Inc., Victor, NY (US)

( * ) Notice: Subject to any disclaimer, the term of this patent is extended or adjusted under 35 U.S.C. 154(b) by 573 days.

This patent is subject to a terminal disclaimer.

(21) Appl. No.: 09/642,312

(22) Filed: Aug. 21, 2000

Related U.S. Application Data

(63) Continuation-in-part of application No. 09/114,021, filed on Jul. 10, 1998, now Pat. No. 6,108,331.

(51) Int. Cl.
*H04L 12/66* (2006.01)
*H04J 3/16* (2006.01)
*H04N 7/20* (2006.01)

(52) U.S. Cl. .............. 370/352; 370/389; 370/400; 370/466; 725/105; 725/109; 725/119

(58) Field of Classification Search ........... 370/352, 370/389, 392, 400, 401, 406, 407, 465, 466, 370/471–475, 486–490, 252; 725/78, 81, 725/105, 109, 112, 119; 348/12
See application file for complete search history.

(56) References Cited

U.S. PATENT DOCUMENTS

| | | | | |
|---|---|---|---|---|
| 5,526,034 A | * | 6/1996 | Hoarty et al. ............... | 725/138 |
| 5,625,863 A | * | 4/1997 | Abraham ..................... | 725/79 |
| 5,642,351 A | * | 6/1997 | Baran ......................... | 370/449 |
| 5,684,799 A | * | 11/1997 | Bigham et al. ............. | 370/397 |
| 5,722,076 A | | 2/1998 | Sakabe et al. .............. | 455/450 |
| 5,736,965 A | | 4/1998 | Mosebrook et al. ........ | 343/702 |
| 5,835,128 A | | 11/1998 | MacDonald et al. ........... | 348/8 |
| 5,903,373 A | | 5/1999 | Welch et al. ............... | 359/152 |

(Continued)

*Primary Examiner*—John Pezzlo
*Assistant Examiner*—Saba Tsegaye
(74) *Attorney, Agent, or Firm*—Brown & Michaels, PC

(57) ABSTRACT

An access node or access port has physical connectors for a variety of signal-receiving and -transmitting devices and includes apparatus that allow all signals used by the devices to be carried by as few as one or two conduits. The conduits can be any signal-carrying medium, including media converters where necessary. Signals are converted to and from addressed data packets carried in a packet stream over the conduits. A central node or node zero receives signals from outside the structure, converts them to addressed data packets, and sends the packets over the conduit(s) as the packet stream. Access nodes take packets addressed to them, convert packets back into the original signals, then feed the signals to appropriate connectors on the access nodes. The central node can also allow internode communication. In place of one of or in addition to the physical connectors, the node has a transceiver in wireless communication with another transceiver connected to a device outside the node using RF or infrared communication. The wireless communication between transceivers can carry the packet stream where one of the transceivers is in the central node. When one of the transceivers is connected to a device, such as a VCR, personal computer, or other signal-transmitting and/or -receiving device, the device can receive signals from the network without having cables extending between the access node and the device.

29 Claims, 9 Drawing Sheets

U.S. PATENT DOCUMENTS

| | | | |
|---|---|---|---|
| 5,903,548 A | 5/1999 | Delamater | 370/310 |
| 5,937,348 A | 8/1999 | Cina et al. | 455/421 |
| 5,940,387 A * | 8/1999 | Humpleman | 370/352 |
| 6,032,089 A * | 2/2000 | Buckley | 701/36 |
| 6,163,532 A * | 12/2000 | Taguchi et al. | 370/338 |
| 6,366,840 B1 * | 4/2002 | Buckley | 701/36 |
| 6,504,834 B1 * | 1/2003 | Fifield | 370/345 |
| 6,535,493 B1 * | 3/2003 | Lee et al. | 370/329 |
| 6,628,627 B1 * | 9/2003 | Zendle et al. | 370/310 |

\* cited by examiner

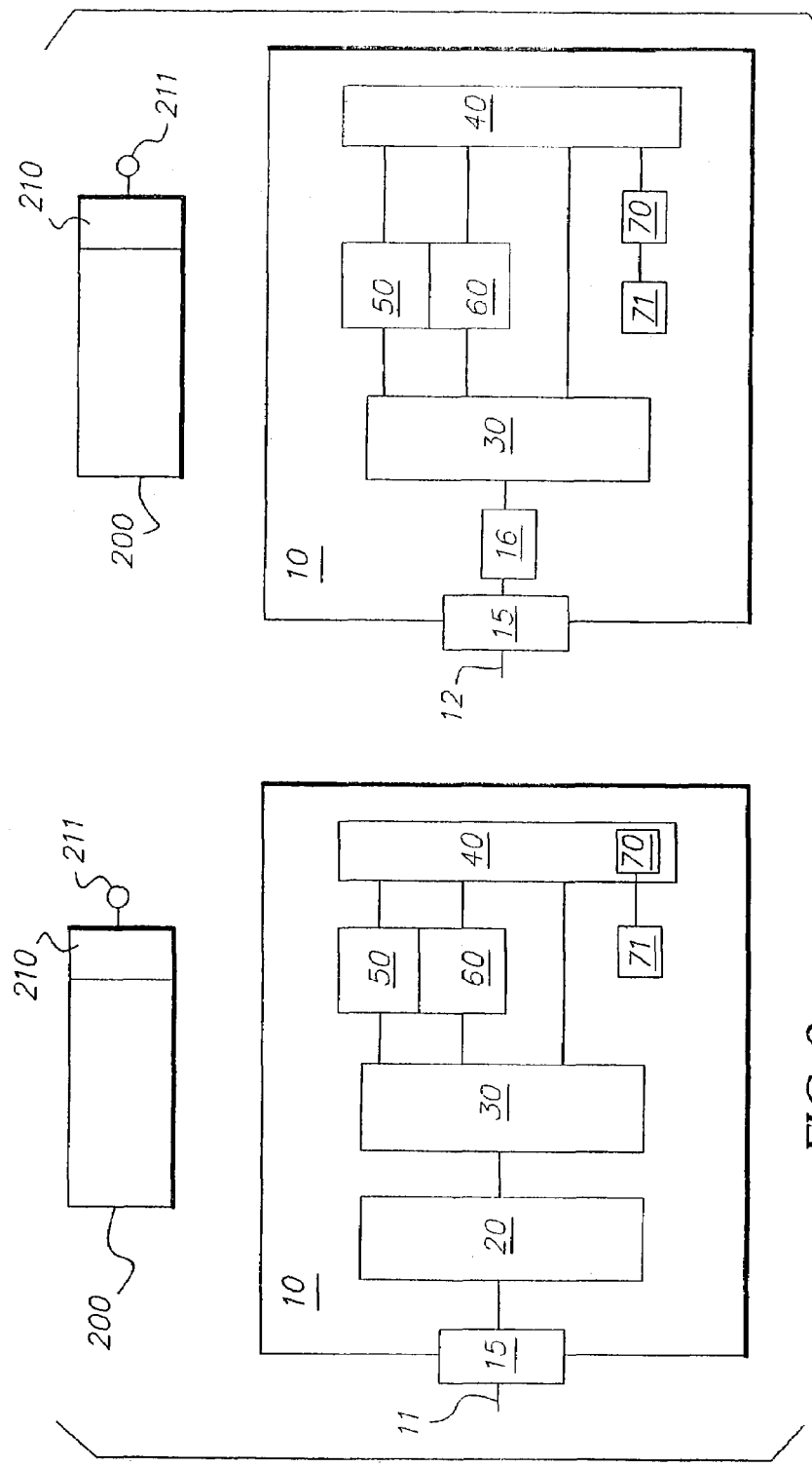

WIRELESS DEVICE CONNECTION IN SINGLE MEDIUM WIRING SCHEME FOR MULTIPLE SIGNAL DISTRIBUTION IN BUILDING AND ACCESS PORT THEREFOR

RELATED APPLICATIONS

This patent application is a continuation in part of pending allowed parent application Ser. No. 09/114,021, filed 10 Jul. 1998, and slated to be patented on 22 Aug. 2000 as U.S. Pat. No. 6,108,331, issued to William H. Thompson.

TECHNICAL FIELD

The invention relates to the field of digital signal distribution networks. The invention particularly relates to access ports for connecting devices to digital networks, particularly in situations where wireless connections to devices are desired or required.

BACKGROUND OF THE INVENTION

Distribution of signals, such as those for telephone and cable television services, has long been handled by separate cabling within a building for each type of signal. When new signals are added, new cables must be wired, and the separate cabling scheme has been maintained even within newly constructed buildings. To reduce costs, the different cables are often bundled and brought to a single access point in a wall where they are connected to respective wall plates and connectors. Some are even connected to wall plates that hold all types of connectors needed for the cables in the bundle. However, running all that cabling from the signal source to each access point is quite expensive. Additionally, the cable bundles are large and hard to work with in the confined spaces available within walls. Further, the access points used with cable bundles require a significant amount of space to accommodate all the hardware to which the cables are attached. If the cables are kept separate, then there would be many access points for respective services in a room requiring an excessive number of wall plates and holes for mounting the wall plates.

The use of wires to connect devices to the wall plates imposes inconvenience on users of the devices. The devices must be located near a wall plate or long wires must be run to the device at its location, creating a hazard to foot traffic. Current wireless transmission schemes require two transceivers including a base unit connected to and located in proximity to the wall plate and a remote unit connected to the device the user wishes to connect to the wall plate via the wireless connection. These transceivers units typically sit adjacent the wall plate and device and have an antennas extending from their bodies. These systems are bulky and cosmetically unappealing.

SUMMARY OF THE INVENTION

My invention builds upon my smart access port that allows the use of a single cable or a pair of cables to carry all types of signals one might wish to distribute within a building, as seen in allowed parent U.S. patent application Ser. No. 09/114,021 filed 10 Jul. 1998, soon to be U.S. Pat. No. 6,108,331 to issued to William H. Thompson on 22 Aug. 2000, the disclosure of which is hereby incorporated by reference. My invention takes advantage of recent developments in radio frequency transmission and infrared transmission to carry the signals between the access port to a remote device. Examples of such technology are the Bluetooth™ and IEEE 802.11 radio frequency standards (implemented in such products as Apple Computer's Airport™ and Lucent's WaveLAN®) and the IrDA infrared standards.

As in the parent device, the access port recognizes signals it receives through a stream of addressed data packets carried by the cable(s), wire(s), or other media. The signals carried by the packet stream are gathered at a central location (node zero or the central node) and are converted into addressed data packets. The addressed data packets are then sent as the packet stream to the access ports within the building. The data packets can additionally be allocated carrier signals at different frequencies according to their type of signal. Any suitable protocol can be used to address the data packets, including ATM, CEBus, and TCP/IP for physical media, or IEEE 802.11 or other suitable wireless standards where wireless communication is used to convey the packet stream from the central node to the access port(s). The packet stream can be carried from node zero to a given access port over a single cable, a pair of cables, multiple wires and/or cables, or even a broadcast signal so that wiring and setup costs are greatly reduced.

Again, as in the device of the parent patent, each access port preferably includes a main module that extends into a recess in a wall, floor, or ceiling of a building, similar to a standard receptacle box. The module can be mounted on a wall plate if the user so desires and can include one or more connectors to connect devices the system. In this modification of the parent device, each access port includes a wireless transceiver that can communicate with transceivers using the same communication scheme and within range of the access port transceiver. Each access port also preferably has a data packet handling system in the main module that receives the packet stream, pulls packets for the port from the stream, converts each pulled packet into its original signal, and sends the packet to a connector of the access port to which a device capable of handling the signal is connected. The packet handling device can pull packets based on a location address, an address for a type of signal that the port can handle, an address for a particular device plugged into a particular access port, or any other suitable criteria.

A major advantage of my system is that it is largely transparent to the user. The user simply plugs a client transceiver into a device and uses the device as usual. The access port and node zero worry about getting signals to and from the access port transceiver, which handles transmissions to and from the device. Further, my invention allows the use of any kind of device from computer network transceivers to Plain Old Telephone Service (POTS) devices as long as the appropriate transceivers are connected to the devices. Node zero can include an analog-to-digital (A/D) converter to translate analog signals, such as conventional telephone, cable television, and radio broadcast signals, into digital signals that can be readily broken into addressed data packets. There is no need for an A/D converter for digital services, such as ISDN, ADSL, digital television, and ethernet services. Where coaxial cable is used to carry the packet stream, the carrier signal frequencies can be allocated so that cable television signals can simply be passed through node zero to the individual wall plates without alteration or translation into data packets.

In addition to receiving packets from the packet stream, translating them into signals, and sending the signals to connectors and/or transceivers, the access ports can send information back to node zero. For example, the access ports can inform node zero of what type of devices are plugged into the ports, a telephone can be picked up and dialed, and a VCR can be played at one port for play on a television connected to another port. Further, any computer on the network can configure the central node and control traffic on the network.

DESCRIPTION OF THE DRAWINGS

FIG. 2 is a schematic view of my access port as used with packet stream carrying media other than copper wiring.

FIG. 3 is a schematic view of my access port as used with copper wiring.

DESCRIPTION OF THE INVENTION

I use the term "addressed data packet" to refer to any discrete quantity of data bearing an address by which the data can be recognized as being sent to a particular destination. I use the term "packet stream" to refer to any series of addressed data packets such as can be carried on a fiber optic cable, a coaxial cable, twisted pair wire or cable, radio broadcast, infrared broadcast, or any other suitable medium. Further, the term "comprising" is used in a non-limiting sense in that an item comprising an element is not required to include only that element, but can include additional elements as well.

Figure 1:
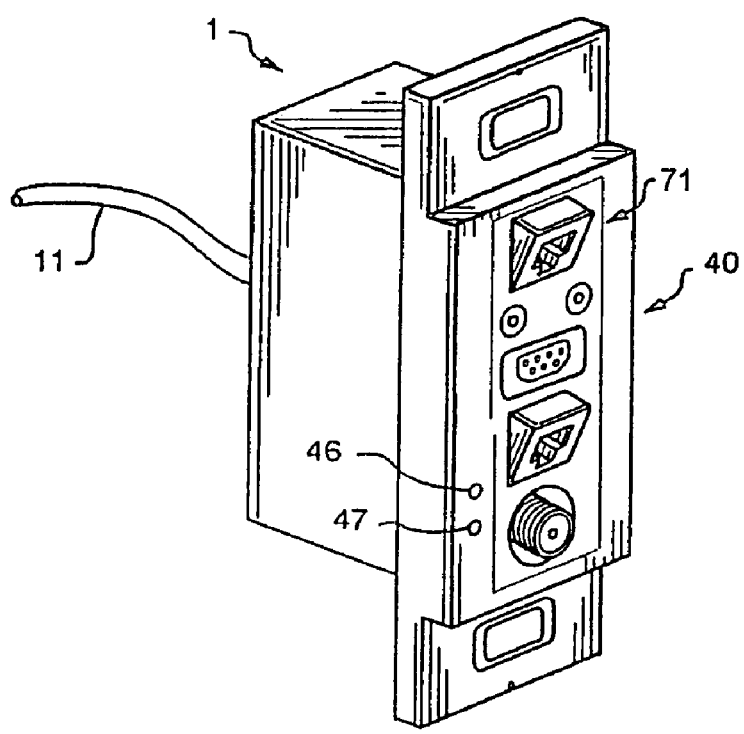
FIG. 1 is an isometric view of the access port of the invention configured for mounting in a wall receptacle box and including an antenna in a wall plate of the access port.
Figure 4:
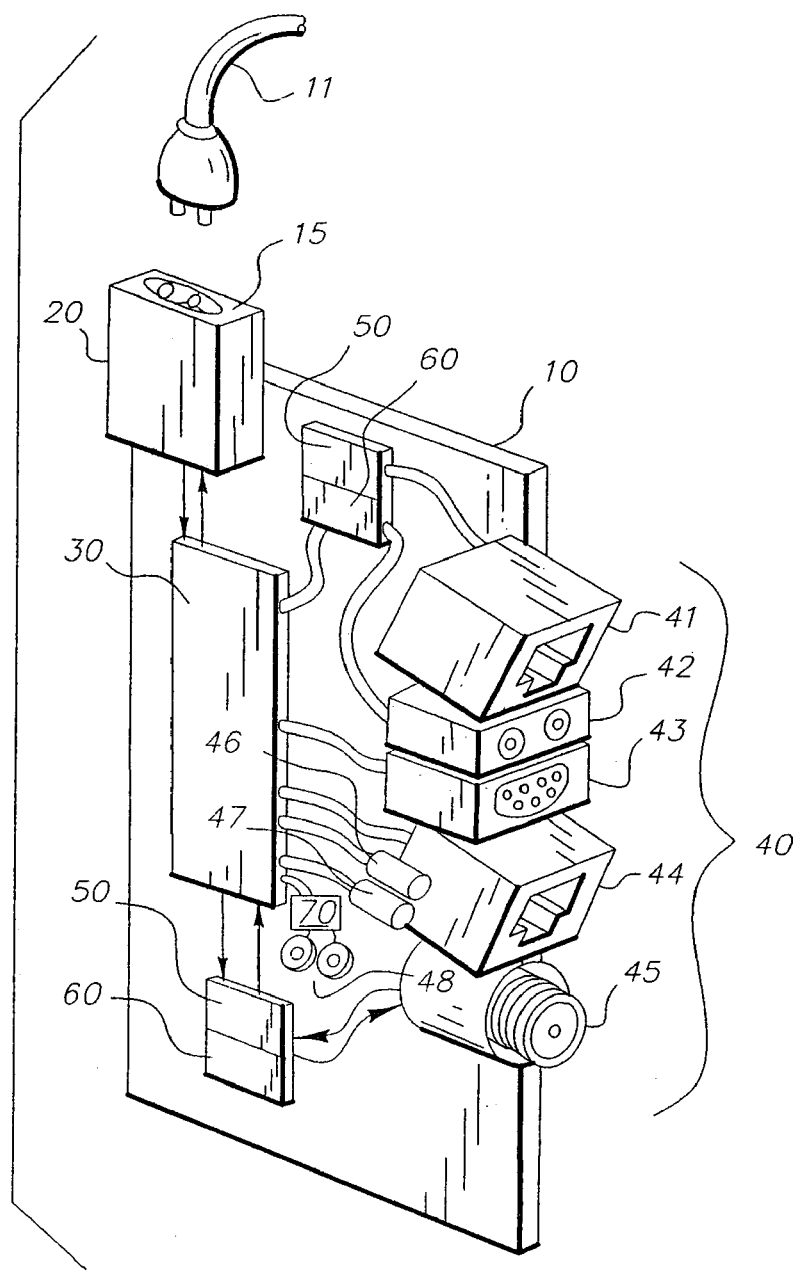
FIG. 4 is an isometric schematic view of my access port as schematically illustrated in FIG. 2 and including connectors for an antenna.
Figure 5:
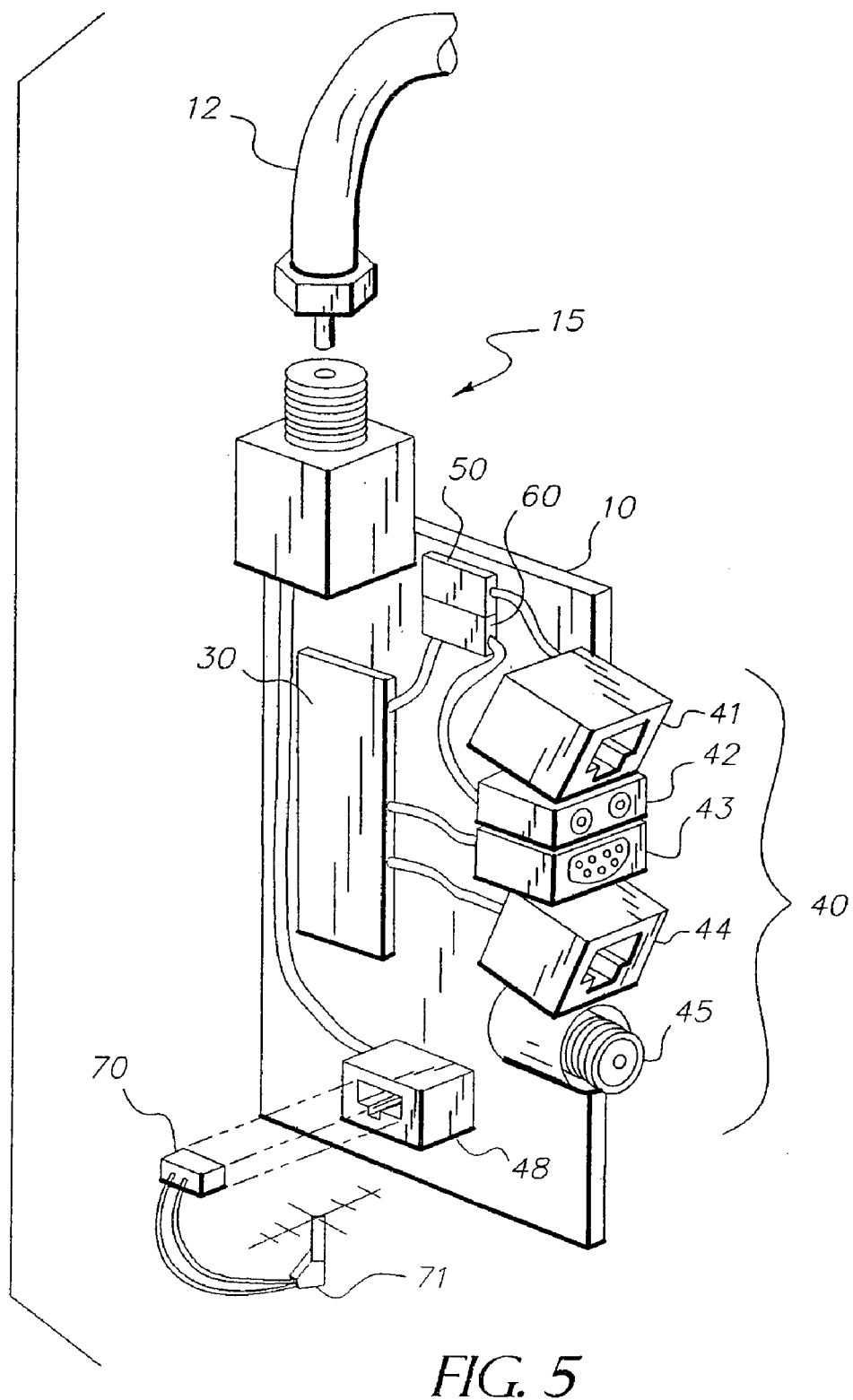
FIG. 5 is an isometric schematic view of my access port as schematically illustrated in FIG. 3 and including an expansion module connector allowing connection of an antenna and/or transceiver.

My access port 1 preferably includes a main module 10 and can be configured to receive the packet stream over a suitable packet distributor or conveyor including one or more conduits, such as wiring, cabling, or even radio or other broadcast. Though I prefer to use fiber optic cable 11 or coaxial cable 12, twisted pair wiring or other acceptable conduits can also be used. While I prefer that the packet stream distributor or conveyor include a single conduit to each access port, two or more conduits can also be used if desired, which can facilitate two-way communications. The packet distributor or conveyor is connected to the main module 10 of my access port 1 via a main module connector 15 that is configured to receive the packet distributor or conveyor. Where the packet stream is carried over coaxial cable 12 or other copper wiring, I use a main module connector 15 configured to receive the conduit(s) of the packet stream conveyor or distributor, such as coaxial cable 12 or other copper wiring as seen in FIGS. 3 and 5. If there are plural conduits, a single main module connector 15 can be used or plural main module connectors can be used as appropriate. For example, the main module connector 15 can be both an input port and an output port when two-way communication is required, or two main module connectors 15 can be used with one for input and one for output.

Where the packet stream is carried by a medium other than copper wiring, I include a media converter 20 between the main module connector 15 and the main module 10 of my access port. The main module connector 15 can assume various forms for non-copper wiring. For example, the main module connector 15 can be an antenna for packet stream distributors or conveyors that include radio frequency broadcasts, in which case the main module 10 would further include a transceiver 16 for packet stream conveyance between the access port 1 and node zero. Such an access port packet stream transceiver 16 would be in communication with the central node transceiver 170 for transmitting the packet stream to access ports capable of receiving such broadcasts. For transmissions between the central node transceiver 170 and the access port packet stream transceiver 16, transceivers implementing a protocol such as the IEEE 802.11 standard are acceptable. The main module connector 15 can also be an optical conduit feeding from the packet stream distributor or conveyor to the media converter 20 when the packet stream distributor or conveyor includes a fiber optic cable. The media converter 20 is configured to convert the packet stream from whatever medium on which it is carried to a form that can be carried in electrical wiring. The media converter 20 then sends the packet stream on to a packet handling system 30, which picks packets addressed to the access port 1 from the packet stream and converts them back into their original signals. The signals are then sent directly to one of the physical medium connectors 40 or to a digital-to-analog (D/A) converter 50 and then to an appropriate one of the physical medium connectors 40. All connectors 40 for analog devices are connected to the D/A converter 50 and to an analog-to-digital (A/D) converter 60 to allow two-way communication through the connectors 40 and the port 10 by analog devices. In the instant modification of the parent device, the main module 10 also includes an access port transceiver 70 receiving conveying the signals between the access port 1 and a remote device 200 including or connected to a device transceiver 210. Where the transceiver requires an antenna beyond its own confines, I prefer to place the antenna 71 within a wall box or even embed the antenna 71 in a wall plate of the access port 1. Similarly, the device transceiver can include an antenna 211 as necessary. Transmitters implementing a low range wireless communications protocol, preferably a radio-frequency protocol such as the Bluetooth™ or IEEE 802.11 standards, are the most appropriate for communications between the access port 1 and the remote device 200. Transmitters implementing one of the IrDA infrared broadcast standards could also be used for the link between the access port 1 and the device to be connected 200. I prefer to include status and activity indicators 46, 47 on the access port so that a user can easily determine these characteristics merely by looking at the indicators 46, 47. Indicators for other characteristics can also be included, as well as separate indicators for each physical connector and/or transceiver 70. I prefer to use light emitting diodes (LEDs) for the indicators.

Power to drive the circuitry of my access port 1 can be provided in a number of ways. For systems using copper cabling, power can be supplied over the same cable that carries the packet stream in much the same way that POTS lines provide power for current telephones. For systems using fiber optic cabling, a photoelectric cell could be included on the main module 10 to convert part of the optical signal to electricity for use by the circuitry of the access port 1. Alternatively, thin, flexible copper conductors disposed adjacent the fiber optic cable could provide the power required by the circuitry. Sources of power independent of the type of packet conveyor are also available. Long-life batteries, such as lithium cells, could be mounted on the main module 10. The access port 1 could also include or be connected to power supplies that would take house AC current and convert it to the type and voltage of electricity required by the circuitry of the access port 1.

Figure 11:
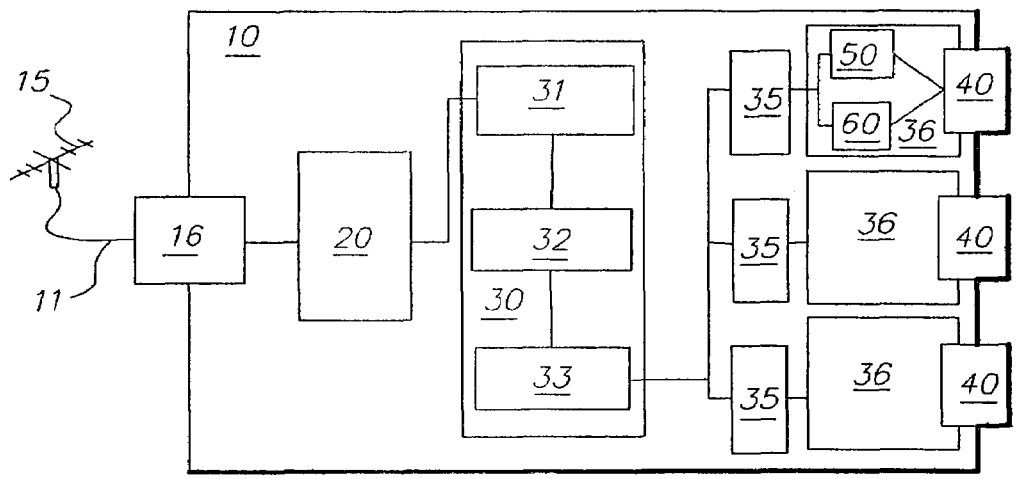
FIGS. 11 and 12 are schematic views of the access port of the invention showing variations in the locations of various components on the main module and on the expansion modules.
Figure 12:
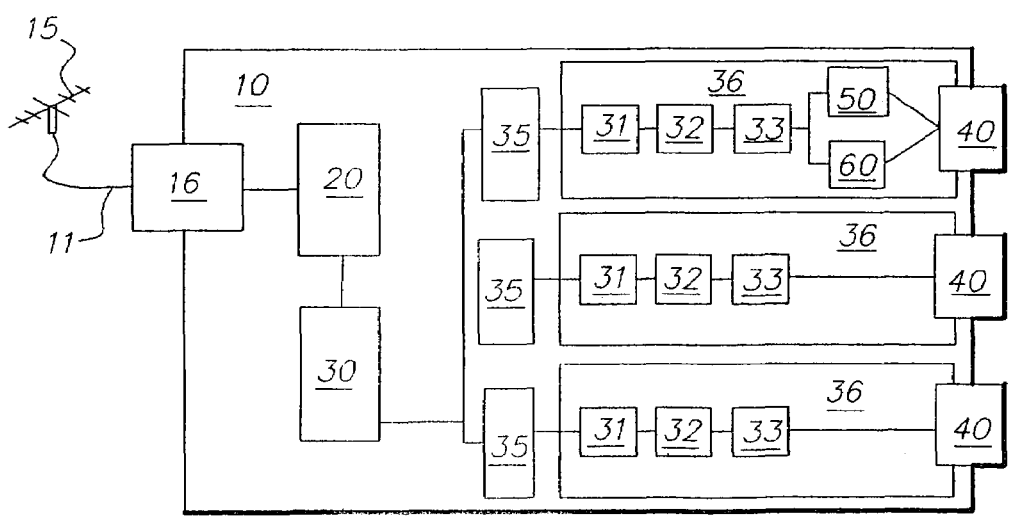
Figure 13:
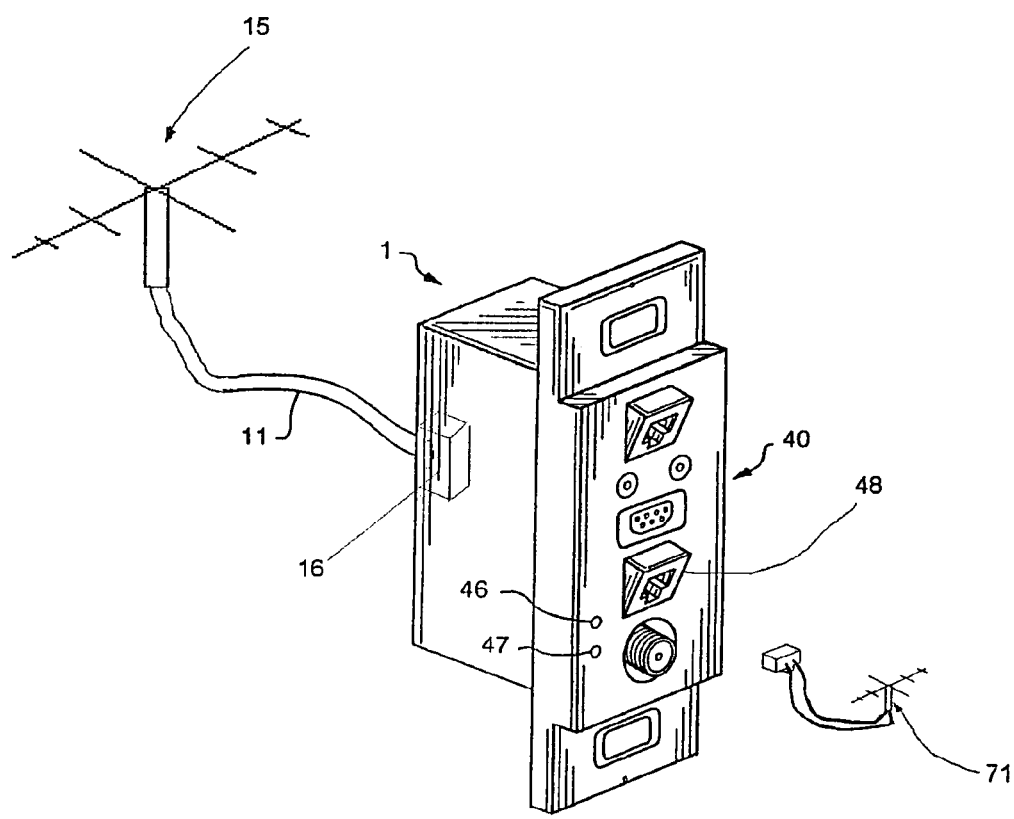
FIG. 13 is an isometric view of my access port where a physical medium connector allows connection of an external antenna and the access port is in wireless communication with the central node.

The circuitry of my access port 1 can all be on the main module 10 or can be modular. That is, each physical medium connector 40 and/or transceiver 70 can include connector- and signal-specific circuitry on its own expansion submodule 36 and be plugged into its own expansion connector 35 on the main module 10 of the access port 1 as seen particularly in FIGS. 11 and 12. The main module 10 in this case would include the main module connector 15, the media converter 20, if necessary, and basic parts of the packet handling system 30 that would at least distribute the packet stream to the expansion connectors 35. The packet handling system 30 could include additional components for further decoding of the packet stream, such as address filters 31, receivers 32, and converters/decoders 33, as seen, for example, in FIG. 11. Where such additional components are included on the main module 10, the packet handling system 30 can be arranged to translate packets from the packet stream into any format appropriate for a physical medium connector 40 and/or access port transceiver 70 that might be plugged into the expansion connectors 35 via expansion submodules 36. The main module 10 could additionally include a connector/transceiver recognition system that recognizes what types of expansion submodules 36 are plugged into the main module 10 so that packets for the respective connectors 35 can be sent to their appropriate destinations. The packet handling system 30 need not have these additional components, but can act as a distributor of the packet stream to the expansion connectors, as seen in FIG. 12, for example. The expansion submodules 36 could then have additional packet handling circuitry, such as address filters 31, receivers 32, and converters/decoders 33, that would translate the packets into the original signal for the physical medium connector 40 and/or transceiver 70 on the expansion submodule 36. Where two-way communication is desired, the modules and/or submodules can include transmitters and encoders, or this functionality can be included in the receivers 32 and converters/decoders 33. The expansion submodules can also carry D/A and A/D converters if desired. Many, if not all, of these components can be software applications rather than actual hardware if so desired and appropriate.

In keeping with the modular implementation of my invention, the antenna 71 can be part of an expansion submodule that can be plugged into the expansion connector 35 on the main module. 10. Such an antenna expansion submodule could include the entire antenna 71 or could simply be a cable or the like extending to an antenna 71 installed elsewhere. Alternatively, an antenna connector could be part of the main module 10, the antenna connector 48 being a physical medium connector 40 into which an antenna could be plugged so that the antenna connection could be modular, but the connector itself would be part of the main module.

Where a network configuration requires, the packet handling system 30 can be arranged to transmit an acknowledgment signal upon receipt of a packet at the access node 1. The acknowledgment signal can be a data packet addressed to the originator of the received packet or can take any other suitable form. In all configurations, the packet handling system 30 includes an address filter that allows packets addressed to the system's access port to pass further into the access port. The packet handling system 30 can also include a speed converter, a media converter where the physical medium connector to which a signal is directed is a fiber optic cable, and a cell disassembler to handle ATM data cells.

Figure 6:
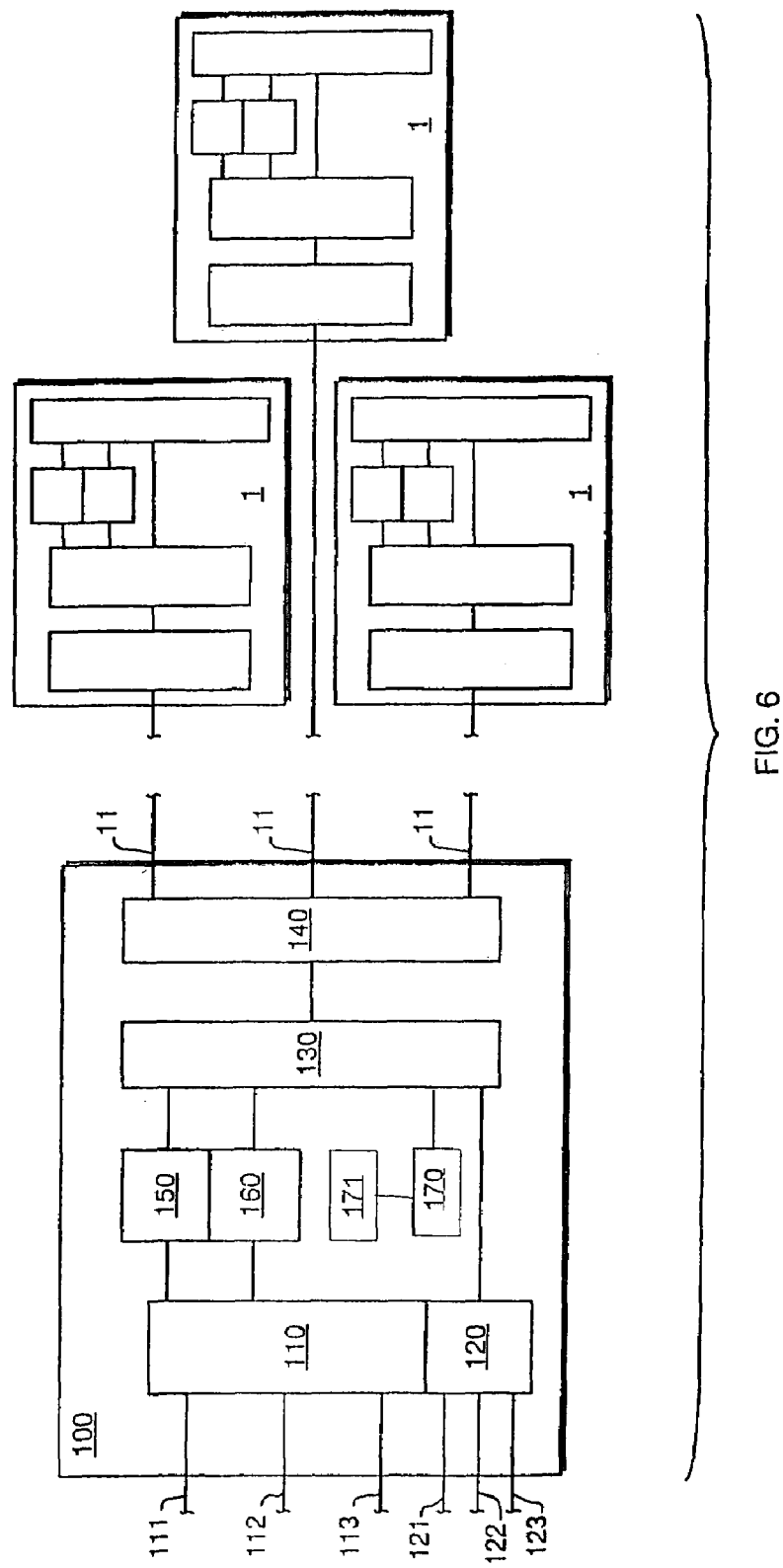
FIG. 6 is a schematic view of a digital network including my access port.
Figure 7:
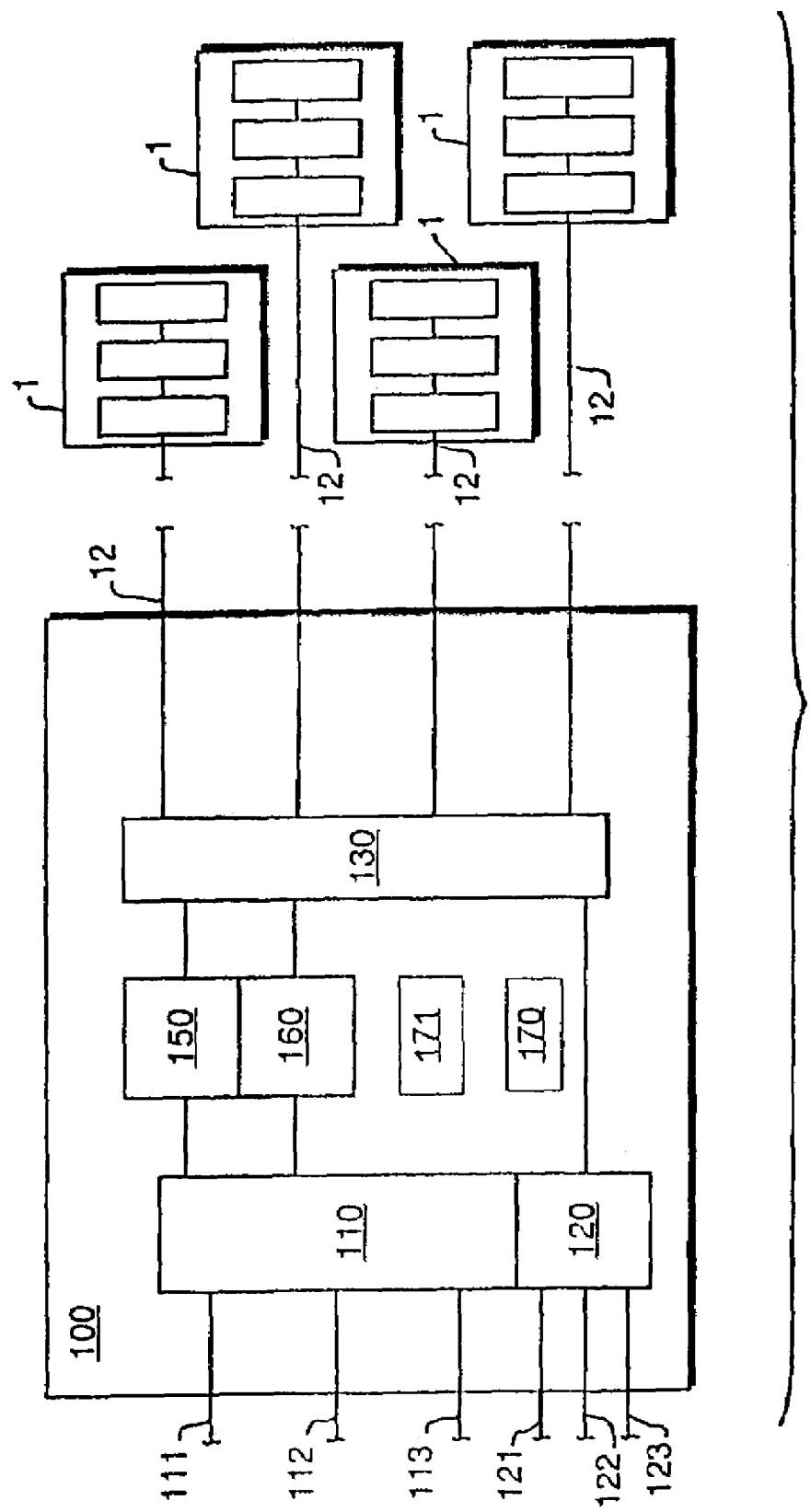
FIG. 7 is a schematic view of a digital network including my access port where the packet stream carrying medium is copper wiring.
Figure 8:
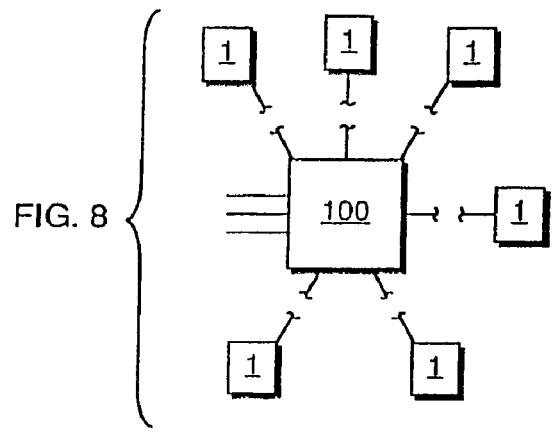
FIG. 8 is a schematic view of a digital network using my access port in a star topology.
Figure 9:
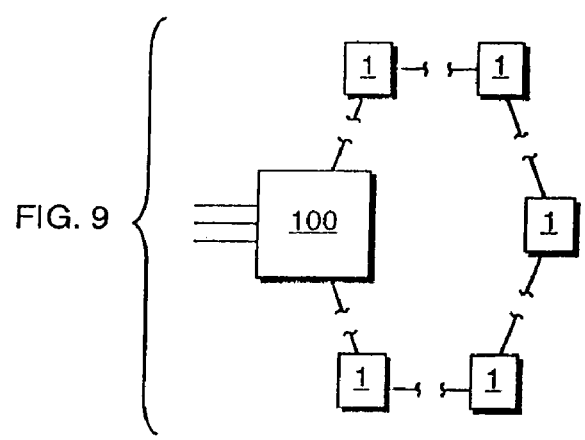
FIG. 9 is a schematic view of a digital network using my access port in a ring topology.
Figure 10:
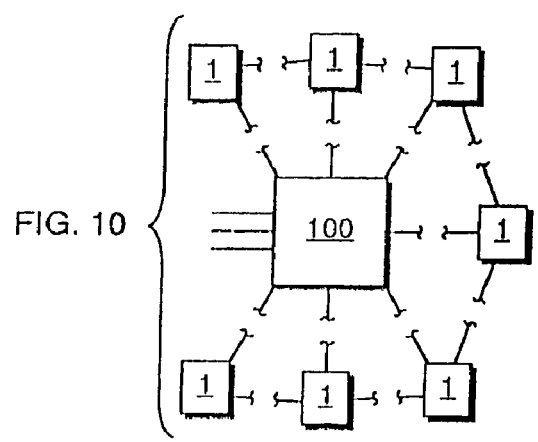
FIG. 10 is a schematic view of a digital network using my access port in a hybrid star/ring topology.

The packet stream received by my access port 1 is preferably generated by a central node or node zero 100, schematic examples of which are shown in FIGS. 6 and 7. Node zero 100 is a main input node that receives signals from outside the network via connectors 110, 120. Analog signals can enter node zero 100 through external analog signal connectors 110 and digital signals can enter node zero 100 through external digital signal connectors 120. The analog signals can include, but are not limited to, POTS 111, conventional broadcast television 112, and conventional cable television 113. Any other analog signal can also be received at node zero 100. The digital signals can include, but are not limited to, HDTV 121, computer network services 122, and digital CATV 123. All of the analog signals that must be are sent to an analog-to-digital converter 150 and then, along with the digital signals from the external digital connectors 120, are sent to a packet handling system 130. The packet handling system 130 can include address filters, converters, encoders, receivers, transmitters, and other such devices or software applications as are known in the art and are required to generate the packet stream. The packet stream is then sent to the access ports 1 via the packet stream distributor, such as coaxial cable 12. Where a nonconductor packet stream distributor is used, the central node 100 includes a media converter 140 that converts the electrical packet stream into an optical packet stream or other type of packet stream as necessary.

The central node 100 is also preferably configured to receive data packets from the access ports 1. Thus, the media converter 140 also receives and converts the optical or other packet stream into an electrical packet stream that is sent to the packet handling system 130. The packet handling system 130 includes routers, address filters, converters, decoders, receivers, transmitters, and other such devices or software applications as are known in the art and are required to pick data packets addressed to the central node 100 from the packet stream and send them to their appropriate destinations. For example, a telephone could be connected to one of my access ports 1 that would send the telephone's outgoing signals to the central node 100 via addressed data packets that would be picked from the packet stream, decoded, and sent on to a telephone service provider such as the service provider from which POTS signal 111 comes.

My access ports 1 can be configured to allow connection of any signal-receiving and/or -transmitting device transparently so that all the user need do is use the device as he or she would with conventional wiring. A given access port can be configured to handle as many devices as desired, yet only requires a single cable to carry all the signals, via the packet stream, to and from node zero. Alternatively, a radio transceiver arrangement, including central node transceiver 170 and access port packet stream transceiver 16 and respective antennas 171 and 15 (media connector 15 is an antenna in this scenario), can be used to convey the packet stream between each access port and node zero.

The preferred implementation of my invention is in combination with a central node or node zero in a residential or commercial structure. The structure would preferably have at least one access port in each room of the building and the central node or node zero in a closet or a basement. For newly constructed buildings, fiber optic or coaxial cable would preferably be run to each access port from the basement and the central node or node zero during construction, though other conduits could be used as discussed above. Retrofitting or installing in an existing structure is not as preferable, but is quite easy to achieve when fiber optic cable is used since the cable is small and flexible and can be run unobtrusively along baseboards or at the juncture of walls and floors to the access ports. Retrofitting with radio broadcast packet stream conveyors or distributors is also easy since no cables need to be installed.

In this preferred implementation, telephone, radio, television, and any other signals are fed into the node zero, which then converts the signals to addressed data packets and sends them to the access ports via the packet stream. The data packets can be addressed using unique access port addresses, unique device addresses, device type addresses, signal type addresses, or any other suitable addressing scheme so long as the access ports are configured to recognize and convert the addressed data packets correctly. Thus, TCP/IP, ATM, CEBus, or any other networking protocol can be used with my invention. Additionally, my invention can be used to enhance use of the devices connected to the network. For example, voice mail and other advanced features can be added to POTS by including appropriate modules in the central node or by applying software programming to the central node. A programmable microprocessor can be included in the central node, and/or any personal computer connected to the network via an access port can communicate with the central node to control features of the network. Further, the two-way communication and addressing provided by my invention allows information from one access port to be broadcast to other access ports. This broadcast feature can be used to allow remote usage of devices on the network. For example, a VCR connected to one port could be used to play a program on a television connected to a port in another location, and the network could be configured to allow remote control signals to be sent to the VCR from the viewing location. Computers connected to the network can also communicate with each other, allowing remote control of a computer with another computer on the network, collaboration between computers/users, and other network activities, such as network gaming.

PARTS LIST

1 Access port; access node
10 Main module
11 Fiber optic cable
12 Coaxial cable
15 Main module connector
16 Packet stream access port transceiver
20 Media converter
30 Packet handling system
31 Address filter
32 Receiver
33 Converter/decoder
35 Expansion connector
36 Submodule
40 Physical medium connectors; device connectors
41 RJ-45 connector
42 RCA connectors
43 Serial connector
44 Ethernet connector
45 Coaxial cable connector
46 Status indicator
47 Activity indicator
48 Antenna connector
50 Digital-to-Analog (D/A) converter
60 Analog-to-Digital (A/D) converter
70 Access port transceiver for remote device(s)
71 Access port transceiver antenna
100 Central node; node zero
110 Connectors for external analog signals
111 POTS signal
112 Conventional (analog) broadcast television signal
113 Conventional (analog) cable television signal
120 Connectors for external digital signals
121 High Density Television (digital) broadcast signal
122 Computer network services signal
123 Digital cable television signal
130 Packet handling system
140 Media converter (e.g. electrical to optical)
150 Analog-to-digital converter
160 Digital-to-analog converter
170 Central node transceiver
171 Central node antenna

I claim:

1. An in-house signal distribution system including:
a main input node mounted in a structure and taking a plurality of external signals for use by different types of devices, converting all of the plurality of external signals into addressed data packets, and conveying all of said addressed data packets in a packet stream to each of a plurality of access node, each access node having a unique node address;
each access node being an access port including a main module mounted in a wall of the structure and further including:
a main module connector connected to the packet stream;
distributing connectors connected to the main module and arranged for connection to different types of video or nonvideo devices, and receive respective ones of the signals distributed by the in-house signal distribution network;
a packet handler that picks packets addressed to the access node from the packet stream; and
the packet handler converting the picked packets back to their respective ones of the signals and sending the respective ones of the signals to a respective distributing connector of the access node; and
a packet stream distributor carrying the packet stream from the main input node output port to each access node main module connector, an access node further including a transceiver in wireless communication with at least one of: the main input node and a device of said different types of devices.

2. The system of claim 1 wherein the transceiver is a radio frequency transceiver.

3. The system of claim 2 wherein the transceiver uses the Bluetooth™ standard.

4. The system of claim 2 wherein the transceiver uses the IEEE 802.11 standard.

5. The system of claim 2 wherein the transceiver in the access node is a distributing connector and sends the picked packets to a device of said different types of devices.

6. The system of claim 2 wherein the transceiver is an access node packet stream transceiver, the main input node includes a central node transceiver in radio communication with the access node, and the packet stream distributor includes the radio communication between the central node transceiver and the access node packet stream transceiver.

7. The system of claim 2 wherein the access node further includes an antenna connected to the transceiver.

8. The system of claim 7 wherein the antenna is embedded in a wall plate of the access node.

9. The system of claim 7 wherein a distributing connector receives an antenna cable, thus allowing selective connection of an antenna to the main module.

10. The system of claim 1 wherein the transceiver is an infrared transceiver.

11. The system of claim 10 wherein the infrared transceiver uses an IrDA infrared broadcast standard.

12. The system of claim 11 wherein:
the main module includes an expansion connector into which a submodule can be inserted; and
the distributing connector is on the submodule, and the distributing connector is the transceiver.

13. The system of claim 12 wherein the transceiver includes an antenna connected to the submodule.

14. The system of claim 11 wherein the main module connector is the transceiver and the packet stream distributor includes radio transmissions between the transceiver and the another transceiver located in a central node of the in-house network.

15. The system of claim 11 wherein the transceiver is a radio frequency transceiver.

16. The system of claim 15 wherein the transceiver uses the Bluetooth™ standard.

17. The system of claim 15 wherein the transceiver uses the IEEE 802.11 standard.

18. The system of claim 11 wherein the transceiver is an IR transceiver.

19. A packet stream decoding access node, said access node being an access port of an in-house digital network, said digital network receiving a plurality of external signals for use by different types of devices, converting all of the plurality of external signals into data packets and conveying all of said data packets in a packet stream to each of a plurality of access nodes, wherein said access node includes apparatus that receives addressed data packets from the packet stream carried by a packet stream distributor and converts the addressed data packets into signals usable by devices connected to distributing connectors of the access node, the apparatus of the access nodes further including:
a main module connector of the access node mounted on a main module of the access node and arranged to receive the packet stream from the packet stream distributor, installed distributing connectors being connected to the main module and arranged for connection to respective different types of video or nonvideo devices, and receive respective ones of the signals distributed by the in-house digital network as a respective portion of the packet stream;
a packet handling system connected to the main module connector that extracts from the packet stream data packets addressed to one of the access node and a device connected to the access node, the packet handling system including a decoder that decodes the extracted data packets into a signal and sends the signal to a distributing connector connected to the main module; and
at least one of: the main module connector and the distributing connector being a transceiver in wireless communication with another transceiver of a remote device.

20. The system of claim 19 wherein:
the main module includes an expansion connector into which a submodule can be inserted; and
the submodule includes an antenna connector through which an antenna can communicate with the transceiver.

21. In an in-house signal distribution system, said signal distribution system receiving a plurality of external signals for use by different types of devices, converting all of the plurality of external signals into data packets, and conveying all of said data packets in a packet stream to each of a plurality of access nodes, an access node of the in-house signal distribution system that is an access port of the in-house signal distribution system and includes:
a main module mounted in a communications box of a structure in which the in-house signal distribution system is installed;
a main module connector mounted on the main module and connected to the packet stream of the in-house signal distribution system, the packet stream including addressed data packets that carry respective portions of the plurality of external signals distributed by the in-house signal distribution system;
distributing connectors connected to the main module and arranged for connection to different types of video or nonvideo devices, and receive respective ones of the signals distributed by the in-house distribution system;
a packet handler that picks packets for the access node from the packet stream;
the packet handler converting the picked packets back to their respective ones of the signals and sending the respective ones of the signals to respective distributing connectors of the access node;
a packet stream distributor carrying the packet stream to the access node main module connector;
at least one of: the main module connector and a distributing connector of the distributing connectors including a transceiver in wireless communication with another transceiver of a remote device.

22. The access node of claim 21 wherein the packet stream is generated by a main input node that takes the plurality of external signals and converts the plurality of external signals into addressed data packets carried by the packet stream to the access node, the plurality of external signals being signals for distribution, the main input node including the another transceiver, the main module connector including the transceiver, and the packet stream including radio transmissions between the transceiver and the another transceiver.

23. In an access port mounted in a communications box recessed within a wall, the access port being an access node of an in-house signal distribution network, said signal distribution network receiving a plurality of external signals for use by different types of devices, converting all of the plurality of external signals into data packets, and conveying all of said data packets in a packet stream to each of a plurality of access nodes, said access port including:
an electronic device mounted on a main module and including a transceiver in communication with a packet handler receiving a packet stream that includes addressed data packets, the packet handler taking from the packet stream data packets addressed to the access node, the transceiver further being in wireless communication with a transceiver of a device external to the access port;

a first converter of the electronic device in communication with the packet handler that discerns what type of signal each data packet represents, converts the data packet to its signal type, and sends the signal to a connector arranged to receive the signal; and the connector being supported on the main module with one end being accessible from within the communications box for connection to the electronic device and another end being accessible from without the communications box for connection to an external video or nonvideo device by a user.

24. The access port of claim 23 wherein the connector is an antenna connector that communicates with the transceiver and protrudes through a wall plate mounted across an open end of the communications box.

25. A packet stream decoding access node being an access port of an in-house digital network, said digital network receiving a plurality of external signals for use by different types of devices, converting all of the plurality of external signals into data packets, and conveying all of said data packets in a packet stream to each of a plurality of access nodes, and said packet stream decoding access node including apparatus that receives addressed data packets from a packet stream carried by a packet stream distributor and converts the addressed data packets into signals usable by devices, including video and nonvideo devices, connected to physical medium connectors of the access node, the apparatus of the access node further including:

a main module connector of the access node mounted on a main module of the access node and arranged to receive the packet stream from the packet stream distributor;

a packet handling system connected to the main module connector that extracts from the packet stream data packets addressed to one of the access node and a device connected to the access node, the packet handling system including a decoder that decodes the extracted data packets into a signal and sends the signal to a physical medium connector connected to the main module;

a wireless connection between a transceiver on the main module and another transceiver external of the access node; and wherein the packet handling system sends an acknowledgment signal via the packet steam distributor when an addressed data packet has been successfully extracted from the packet stream.

26. The access node of claim 25 wherein the wireless connection includes the packet stream distributor, the transceiver is the main module connector, and the another transceiver is in a central node of the digital network.

27. The access node of claim 25 wherein the wireless connection includes extracted packets, the transceiver is a distributing connector, and the another transceiver is part of a device accessing the digital network via the wireless connection.

28. The access node of claim 25 further including an antenna connected to the transceiver and mounted in a wall plate of the access node.

29. The access node of claim 25 further including an antenna connector on the main module, the antenna connector itself being connected to the transceiver and providing selective communication between the transceiver and the antenna.

* * * * *